(12) United States Patent
Williams et al.

(10) Patent No.: US 10,907,025 B1
(45) Date of Patent: Feb. 2, 2021

(54) POLYAMIDE/POLYIMIDE AEROGELS

(71) Applicant: United States of America as represented by the Administrator of NASA, Washington, DC (US)

(72) Inventors: Jarrod C. Williams, Lakewood, OH (US); Mary Ann B. Meador, Strongsville, OH (US)

(73) Assignee: United States of America as Represented by the Administrator of National Aeronautics and Space Administration, Washington, DC (US)

( * ) Notice: Subject to any disclaimer, the term of this patent is extended or adjusted under 35 U.S.C. 154(b) by 236 days.

(21) Appl. No.: 16/111,586

(22) Filed: Aug. 24, 2018

Related U.S. Application Data

(62) Division of application No. 15/251,317, filed on Aug. 30, 2016, now Pat. No. 10,066,073.

(51) Int. Cl.
*C08J 9/28* (2006.01)
*C08G 73/10* (2006.01)
*C08G 101/00* (2006.01)

(52) U.S. Cl.
CPC .......... *C08J 9/286* (2013.01); *C08G 73/1067* (2013.01); *C08G 2101/0091* (2013.01); *C08J 2379/08* (2013.01)

(58) Field of Classification Search
CPC .............................. C08J 9/286; C08G 73/1067
See application file for complete search history.

(56) References Cited

PUBLICATIONS

Meador et al. Mechanically Strong, Flexible Polyimide Aerogels Cross-Linked with Aromatic Triamine. ACS Appl. Mater. Interfaces 2012, 4, 2, 536-544 (Year: 2012).*
Meador et al.Polyimide Aerogels with Amide Cross-Links: A Low Cost Alternative for Mechanically Strong Polymer Aerogels. ACS Appl. Mater. Interfaces 2015, 7, 2, 1240-1249 (Year: 2015).*

* cited by examiner

*Primary Examiner* — Michael M Dollinger
*Assistant Examiner* — Christina H. W. Rosebach
(74) *Attorney, Agent, or Firm* — Robert H. Earp, III; Mark Wolfgang; Helen M. Galus

(57) ABSTRACT

An aerogel and method of making the aerogel is disclosed. The aerogel is a polyimide/polyamide hybrid with a cross-linking agent that induces gelation.

6 Claims, 7 Drawing Sheets

POLYAMIDE/POLYIMIDE AEROGELS

CROSS-REFERENCE TO RELATED APPLICATIONS

This application claims priority to, and is a divisional of, pending U.S. patent application Ser. No. 15/251,317 entitled "Polyamide/Polyimide Aerogels" filed on Aug. 30, 2016. The entirety of the above-noted application is incorporated by reference herein.

ORIGIN OF THE INVENTION

The invention described herein was made by employees of the United States Government and may be manufactured and used by or for the Government for Government purposes without the payment of any royalties thereon or therefor.

BACKGROUND

Aerogels are porous solids with high surface areas that are made by forming a gel network and removing the solvent without causing pore collapse. Due to characteristics such as high surface area, high porosity, and low density, these lightweight aerogels are attractive for use as thermal insulators, low dielectric substrates, catalyst supports, and as building and construction materials. A great deal of attention has been paid to investigating alternate aerogel backbones such as polymers and polymer-silica hybrids in order to overcome the fragility and lack of flexibility associated with silica aerogels.

The inherent fragility of silica aerogels has been addressed in several ways. One approach involves the reaction of oligomers containing functional moieties such as styrene, epoxy, or isocyanate with pendant functionalities on the silica backbone such as amines, hydroxyl or vinyl groups that are either covalently linked to a preformed aerogel or attached during oligomerization and gelation. More robust aerogels are obtained but at the expense of the use temperature. Furthermore, while the compressive moduli of, for example, epoxy cross-linked silica aerogels can be quite high (326 MPa), these increases come at the expense of substantial increases in density (0.85 g/cm3).

More recently, polymer aerogels have been fabricated through the formation of either chemically or physically cross-linked networks which avoid the use of silica altogether. Polymer aerogels tend to be more robust than pure silica aerogels and since factors such as polymer chain length and cross-link density can be controlled it is possible to generate a broad spectrum of properties from a few simple monomers. For example, syndiotactic polystyrene aerogels have been produced by allowing hot solutions of the polymer to form physically interlinked semicrystalline domains that act as virtual cross-links upon cooling. These materials were found to be hygroscopic and were attractive sorption and desorption substrates for removing impurities from air and fluids; however, with their lack of covalent crosslinks, and resulting poor mechanical properties, alternative strategies were employed resulting in increased Young's moduli for these materials.

One strategy for improving the mechanical properties of polymer aerogels has been to investigate composites. A recent investigation has shown that the addition of carbon nanotubes to thermo-reversible polystyrene gels results in their homogenous dispersion and the formation of an interpenetrating 3D network of nanotubes and physically bonded polystyrene domains. The net result was no change for the surface areas but an enhancement of the compressive moduli of the materials with values as high as 6.4 MPa at 0.06 g/cm$^3$. Polystyrene aerogels of the same density, but without nanotube reinforcement, had a lower compressive modulus at 4.2 MPa.

While physical cross-links and the formation of nanotube composites, as in the case of polystyrenes, give rise to modest increases in mechanical properties, a superior approach relies on the use of covalently cross-linked oligomers to form an aerogel. An illustrative example of this relies on the use of various di and tri isocyanates of varying geometries reacting with triethylamine and water in order to oligomerize, cross-link, and form polyurea aerogel networks with good mechanical properties. It was demonstrated that at a given density, these materials tended to have higher Young's moduli than their polystyrene and hybrid aerogel counterparts. Young's moduli ranging from 4 to 300 MPa were obtained in the density range of 0.03-0.55 g/cm$^3$. Even at densities of 0.03 g/cm$^3$, half the density of the strongest polystyrene nanocomposite aerogel, covalently cross-linked polyurea aerogels have a higher Young's modulus (7.03 MPa) than the polystyrenes. When compared to epoxy reinforced silica aerogels of similar densities, polyurea aerogels tend to have Young's moduli that are at least twice as large. For example, in the range of 0.19-0.20 g/cm$^3$, reinforced silica has a modulus of 13 MPa while covalently crosslinked polyurea aerogels have moduli around 33 MPa.

While these recent advancements in the areas of organic polymeric aerogels and inorganic hybrids have increased the strength and durability of these materials over pure silica aerogels, low use temperatures limit their utility. A substantial improvement over these earlier technologies was the development of the polyimide aerogels, which exhibit Young's moduli as high as 102 MPa at densities as low as 0.181 g/cm$^3$ making them, as a function of density, more rigid than isocyanate and styrene derived aerogels. The techniques used to fabricate them are simple and easily scalable. However, the use of relatively expensive diamines and dianhydrides coupled with the use of cross-linkers such as 1,3,5-triaminophenoxybenzene and octa(aminophenyl) silesquioxanes, which are not widely available, are limiting factors in their widespread application.

SUMMARY

The following presents a simplified summary of the innovation in order to provide a basic understanding of some aspects of the innovation. This summary is not an extensive overview of the innovation. It is not intended to identify key/critical elements of the innovation or to delineate the scope of the innovation. Its sole purpose is to present some concepts of the innovation in a simplified form as a prelude to the more detailed description that is presented later.

In one aspect, the innovation disclosed herein comprises a hybrid polyamide-polyimide network created from the reaction of amine end-capped polyamide oligomers with anhydride end-capped polyimide oligomers to fabricate polyamide-polyimide oligomers end-capped with either amine or anhydride. The oligomers are cross-linked with a triacid chloride or multifunctional amine, respectively in order to form a gel. The resulting gel is subjected to supercritical fluid extraction using carbon dioxide to remove the reaction solvent without bringing about pore collapse of the material. The resulting aerogels that arise from this procedure have low density, high porosity, high surface area, and good mechanical strength.

In still another aspect, the innovation disclosed herein includes a method of creating an aerogel that includes preparing a solution including a polyimide oligomer, adding a polyamide oligomer to the solution, adding a cross-linking agent to the solution, allowing the solution to become a gel, exchanging the reaction solvent to one miscible with $CO_2$ and subjecting the gel to supercritical drying.

In another aspect, the innovation disclosed herein comprises a method of creating a polyamide/polyimide aerogel that includes preparing a solution including at least one dianhydride and at least one diamine in a first solvent, adding at least one polyamide oligomer to the solution, adding a cross-linking agent to the solution, allowing the solution to become a gel, and subjecting the gel to supercritical drying.

In still another aspect, the innovation disclosed herein includes an aerogel that includes a solution comprising at least one anhydride capped polyimide oligomer, at least one amine capped polyamide oligomer, and a cross-linking agent that induces gelation in the solution.

To the accomplishment of the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
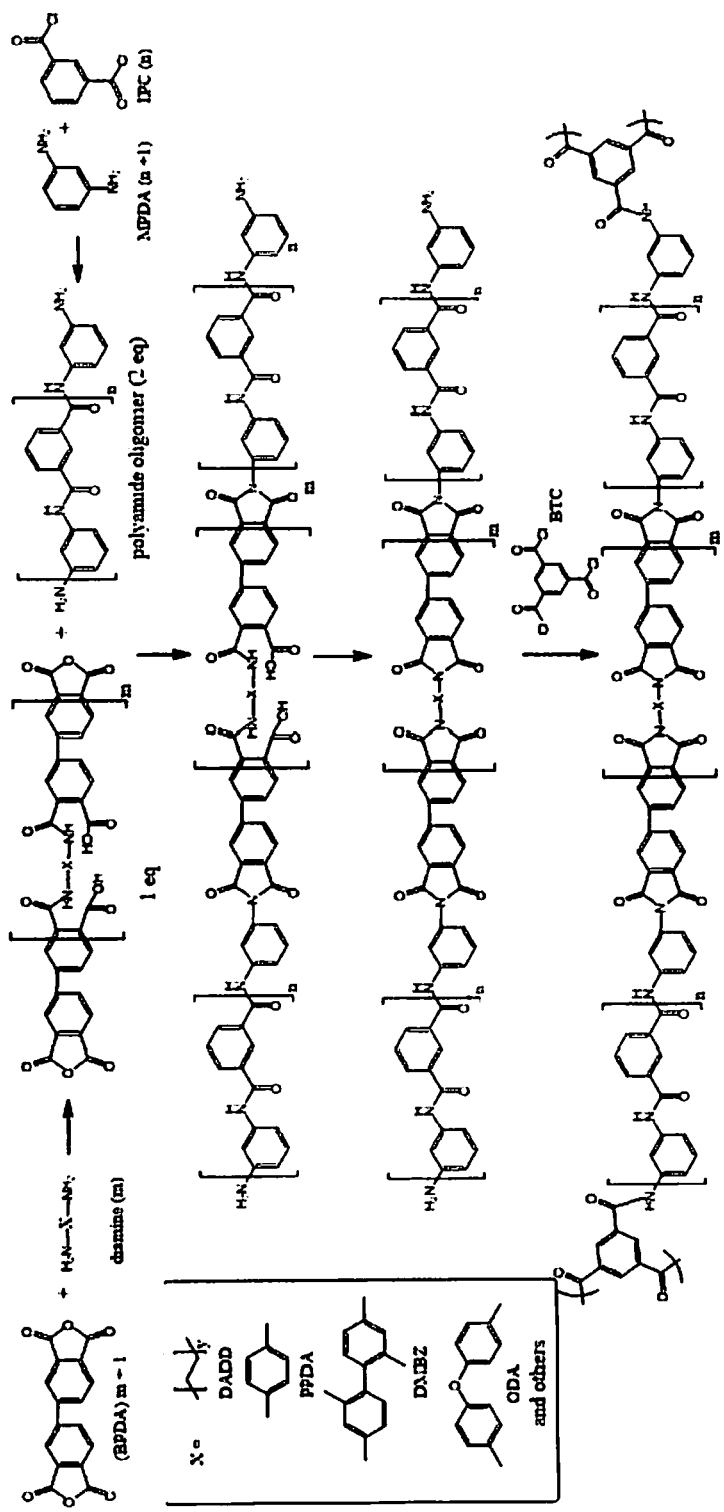
FIG. 1 illustrates a solution of a polyamic acid oligomer capped with anhydride in accordance with aspects of the subject innovation.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details.

While specific characteristics are described herein (e.g., thickness, orientation, configuration, etc.), it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

What follows is a more detailed discussion of certain compositions, articles, methods, materials, and apparatuses associated with aspects of the subject innovation. To aid in the understanding of aspects of the subject innovation, theoretical analysis and experimental results associated with specific experiments that were conducted are discussed herein. However, although for the purposes of obtaining the results discussed herein, specific choices were made as to the selection of various aspects of the experiments and associated setups—such as choice of materials (e.g., selection of diamine(s) or diacid chloride(s), solvent(s), relative concentration of isomers, etc.), solid concentration, repeat units, etc.—the compositions, articles, and methods described herein can be employed in other contexts, as well. For example, various aspects of the subject innovation can be utilized to produce aerogels for a variety of uses terrestrial or otherwise (e.g., as insulators, as low dielectric substrates, etc.). In some embodiments, different selections of materials or formulation parameters can be selected than those used in the experiments discussed herein, and may have differing characteristics, as explained in greater detail below.

Polyimide aerogels are robust, low density materials with excellent insulation properties and low dielectric constants, making them enabling as thermal or electrical insulation for any number or aerospace or terrestrial applications. However, the monomers used to make the polyimide aerogels are costly. Thus, aromatic polyamide aerogels were fabricated using less expensive monomers, which were shown to have better mechanical properties than the polyimide aerogels. However, polyamide aerogels have a tendency to shrink and/or distort during the fabrication process, thereby limiting the size and form factor available.

In order to overcome the above mentioned disadvantages, the innovation disclosed herein is an innovative polymer aerogel (e.g., "gels" including a microporous solid and a gaseous dispersed phase) and method of making same comprising both polyimides and polyamides. The resulting polymer aerogel can be made from block copolymers or separate oligomers of polyamide and polyimide. The copolymer can replace approximately 80% of the more expensive polyimide monomers with the inexpensive starting materials used to make polyamide aerogels. The resulting polymer aerogels have enough polyimide content so that the aerogel does not shrink and/or distort and are more cost effective. Properties such as porosity, surface area, density, and rigidity are comparable to those observed for 100% polyimide aerogels. The cross-linker 1, 3, 5 benzenetricarbonyl trichloride or benzenetricarboxylic acid chloride (BTC), which is inexpensive, commercially available, and effective at inducing gelation in solutions of both polyimide and polyamide oligomers is also effective forming polyimide/polyimide chains and at inducing gelation in solutions composed of the two. Other cross-linkers that may be used includes, but not limited to, 1,3,5-triaminophenoxybenzene (TAB) and octa (aminophenyl) polyhedral oligomeric silsesquioxane (OAPS).

Diamines and diacid chlorides are the components for the polyamide segments while diamines and dianhydrides are the components for the polyimide segments. Any combination of the above components can be used to make the materials for the innovative aerogel. Alternatively, the polyamide segments may be formed through high-temperature reaction of dicarboxylic acids and diamines. In addition, it is also possible to form the polyamide segments via a transamidation/transesterification reaction between materials such as phenylenediamine and dimethylisophthalate. The resulting oligomers can be added to a solution containing polyimides with reactive end groups to form the hybrid oligomers.

As illustrative examples, in various embodiments, diacid chlorides that can be used in accordance with aspects of the subject innovation can include, but are not limited to: isophthaloyl chloride (IPC), terephthaloyl chloride (TPC), 2,2-dimethylmalonoyl chloride, 4,4'-biphenyldicarbonyl dichloride, azobenzene-4,4'-dicarbonyl dichloride, 1,4-cyclohexanedicarbonyl dichloride, succinyl chloride, glutaryl chloride, adipoyl chloride, sebacoyl chloride, suberoyl chloride, and pimeloyl chloride, etc.

Further, in some illustrative examples, dianhydrides that can be used can include, but not limited to, biphenyltetracarboxylic acid dianhydride (BPDA), 4,4'-hexafluoroisopropylidenebisphthalic dianhydride (6FDA), pyromellitic dianhydride (PMDA), 4,4'-oxydiphthalic anhydride (ODPA).

Additionally, in various embodiments, illustrative examples of diamines that can be used in accordance with aspects of the subject innovation can include, but are not limited to: 4,4'-oxydianiline (ODA), 2,2'-dimethylbenzidine (DMBZ), 2,2-bis-[4-(4-aminophenoxy)phenyl]propane (BAPP), 3,4'-oxydianiline (3,4-ODA), 4,4'-diaminobiphenyl, methylenedianiline (MDA), 4,4'-(1,4-phenylene-bismethylene)bisaniline (BAX), p-phenylenediamine (pPDA), meta phenylenediamine (mPDA), azodianiline, 1,4-diaminonaphthalene, 1,5-diaminonaphthalene, 1,8-diaminonaphthalene, hexamethylene diamine, etc.

Both polyimide and polyamide aerogels of the prior art arise from the step-growth polymerization between a doubly nucleophilic moiety (in both cases a diamine) and a doubly electrophilic moiety (diacid chloride in the case of polyamide and dianhydride in the case of polyimide). The termini of the chains of either species can be formulated to be either nucleophilic or electrophilic. This key attribute shared by both species allows solutions of their oligomers to be reacted with each other to form block copolymers with alternating polyimide and polyamide segments of varied length or to react separately synthesized amine terminated polyimide and polyamide oligomers in a combined solution with a cross-linker. The resulting block copolymers, with carefully formulated end group stoichiometries, can then be reacted with a cross-linking agent such as 1, 3, 5 benzenetricarbonyl trichloride or 1, 3, 5 triaminophenoxy benzene in order to induce gelation. Super critical drying of the resulting gels provides hybrid polyamide/polyimide aerogels.

Referring to FIG. 1, block copolymer aerogels using polyimide (PI) and polyamide (PA) blocks can be made by first fabricating amine capped PA oligomer in solution, followed by isolating it as a white solid in high yield. The PA is then added in a 2 to 1 ratio to a solution of polyamic acid oligomer capped with anhydride, as shown in FIG. 1. After cross-linking and supercritical drying, the block copolymer aerogel has properties derived from both PI and PA oligomers. The following examples illustrate different processes to fabricate the innovative polyamide/polyimide aerogel in accordance with aspects of the innovation. It is to be understood in the following examples and in the entire disclosure, while measurements (e.g., quantity, mass, weight, volume, concentrations, heating and cooling temperatures, density, measurements of time, etc.) are disclosed, these measurements are approximate and are not intended to limit the scope of the innovation.

Figure 2:
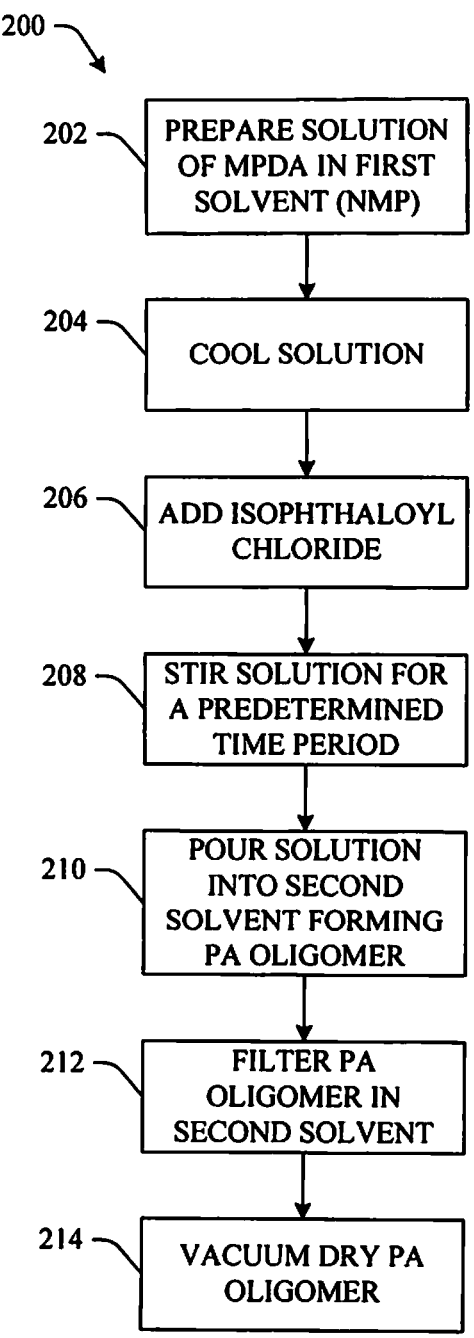
FIG. 2 illustrates a method of fabricating a polyamide oligomer in accordance with aspects of the subject innovation.

First, referring to FIG. 2, one example 200 of a PA oligomer for use in the innovative polyamide/polyimide aerogel is illustrated where the formulated repeat units (n) is 10 (n=10). At 202, a solution of 20 g m-phenylene diamine (MPDA) in 200 ml N-methyl-2-pyrrolidone (NMP) (first solvent) is prepared. At 204, the solution is cooled to 0° C. for predetermined time (e.g., thirty minutes). At 206, 34.147 g of isophthaloyl chloride (IPC) was added. At 208, the mixture is stirred for predetermined time period (e.g., 1 hour). At 210, the solution is poured into 200 ml of a second solvent (e.g., methanol, ethanol, etc.) at which time the PA oligomer precipitated. At 212, the PA oligomer precipitate was filtered and washed with more of the second solvent. At 214, the PA oligomer precipitate is vacuumed dried at 70° C. and the PA oligomer is obtained as a white powder in 98% yield.

Figure 3:
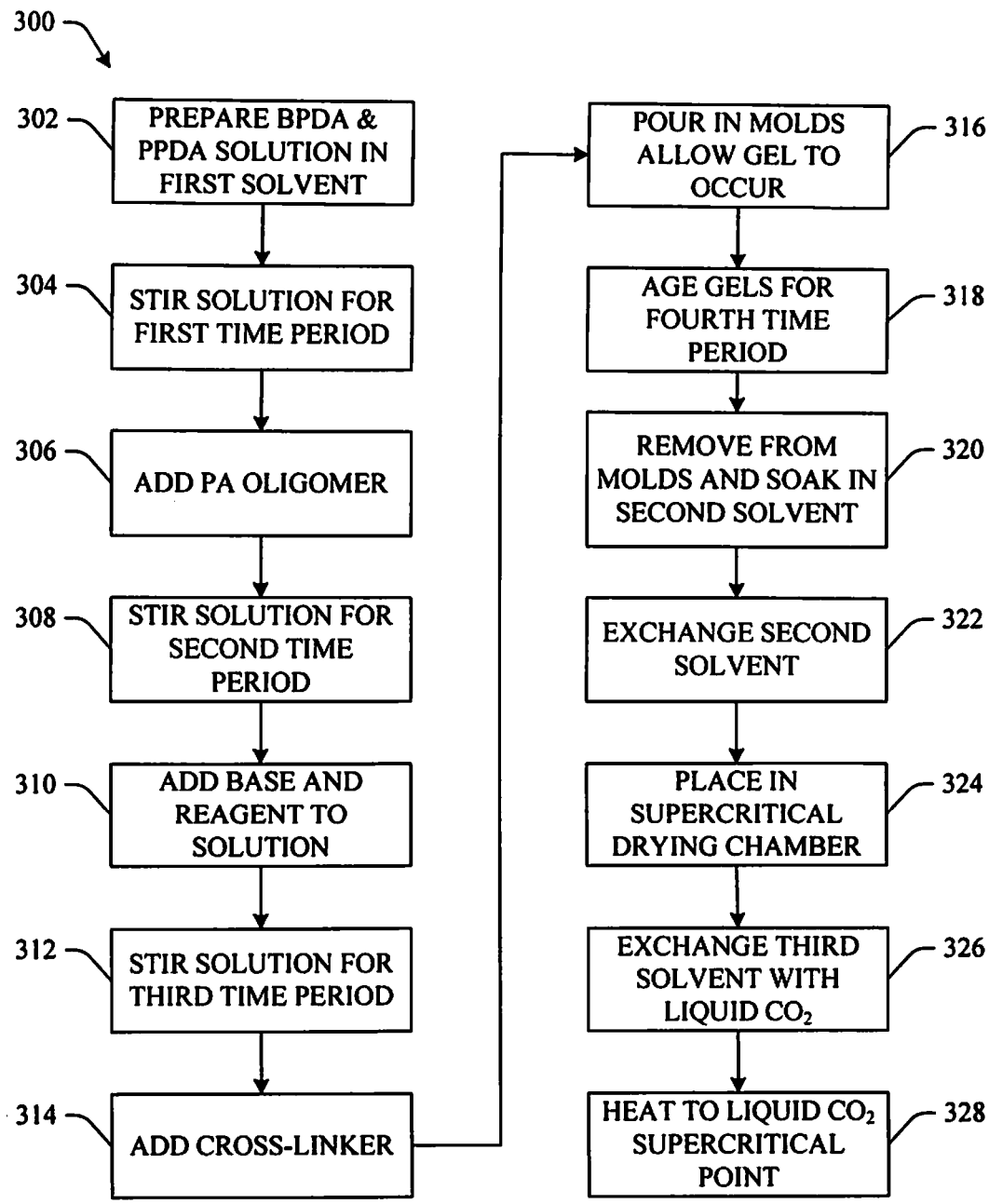
FIG. 3 illustrates one example method of fabricating a polyamide/polyimide aerogel in accordance with aspects of the subject innovation.

FIG. 3 illustrates one example 300 of fabricating the innovative polyamide/polyimide aerogel in accordance with an aspect of the innovation. In this example, the PA oligomer described above and illustrated in FIG. 2 where n=10 will be used with a PI oligomer where the number of repeat units (m) is 10 (m=10) with p-phenylene diamine (PPDA). At 302, 4.49 g of 3,3'4,4'-biphenyl-tetracarboxylic acid dianhydride (BPDA) (PI oligomer) is added to a solution of 1.5 g PPDA (diamine) in 103.89 ml NMP (first solvent). At 304, the solution is agitated (e.g., stirred) for a first time period (e.g., 10 minutes). At 306, 6.904 g of the PA oligomer produced above is added to the solution. At 308, the solution is stirred overnight for a second time period at which time the mixture dissolves. At 310, a base and a reagent including 2.25 ml of triethylamine and 11.5 ml of acetic anhydride respectively are added to the dissolved solution to facilitate chemical reactions. At 312, the solution is stirred for a third time period (e.g., one minute). At 314, 0.25 g of benzene tricarboxylic acid chloride (BTC) (cross-linking agent) is added. At 316, the solution is poured into molds where gelatin occurs within minutes. At 318, the gels are aged in the molds for a fourth time period (e.g., overnight). At 320, the gels are removed from the molds and placed in a second solvent that is miscible with liquid $CO_2$ (e.g., ethanol, methanol, acetone, etc.) to exchange the first solvent in the gel. At 322, the second solvent is replaced with fresh solvent a number of times (e.g., one time, two times, three times, four times, five times, etc. in one day intervals) to remove the first solvent from the gels. At 324, the gels are placed in a supercritical drying chamber. At 326, a third solvent (e.g., acetone, etc.) in the supercritical drying chamber is exchanged a number of times (e.g., one time, two times, three times, four times, five times, etc.) with liquid $CO_2$. At 328, the supercritical drying chamber is heated to 45° C. to take the $CO_2$ to its supercritical point at which time the supercritical drying chamber is vented. The resulting yellow aerogels have a density of 0.25 g/cm³, surface area of 314

$m^2/g$ measured by nitrogen sorption-desorption, a porosity of 82% and a Young's Modulus of 74 MPa measured from compression.

Figure 4:
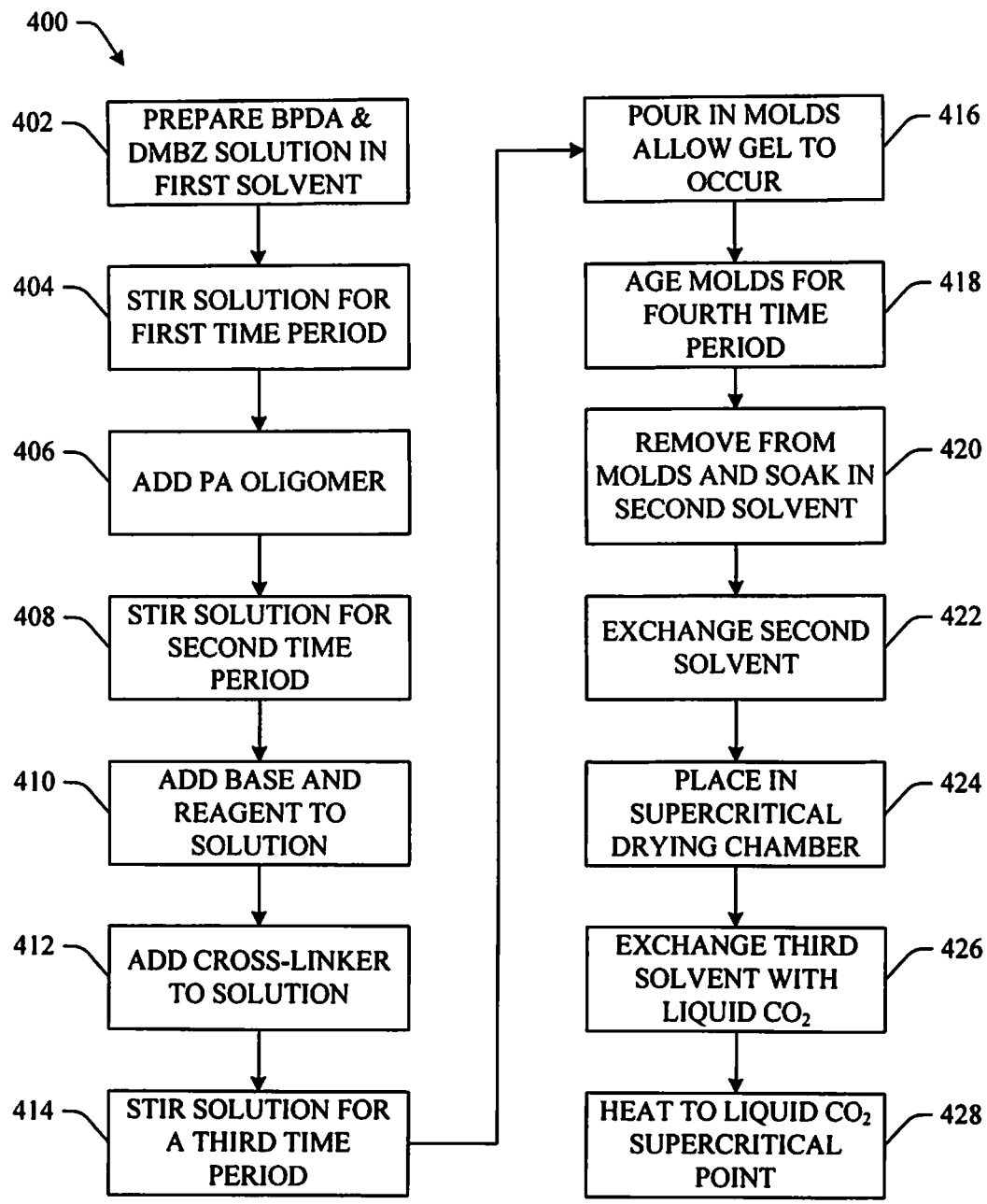
FIG. 4 illustrates another example method of fabricating a polyamide/polyimide aerogel in accordance with aspects of the subject innovation.

FIG. 4 illustrates another example 400 of fabricating the innovative polyamide/polyimide aerogel in accordance with an aspect of the innovation. In this example, the PA oligomer described above and illustrated in FIG. 2 where n=10 will be used with a PI oligomer where the number of repeat units (m) is 10 (m=10) with 4, 4'-dimethylbenzidine (DMBZ). At 402, 4.49 g BPDA (PI oligomer) is added to a solution of 2.945 g DMBZ (diamine) in 122 ml NMP (first solvent). At 404, the solution is stirred for a first time period (e.g., 15 minutes) to form a polyamic acid oligomer. At 406, 6.904 g of the PA oligomer produced above is added. At 408, the solution is stirred for a second time period (e.g., overnight) thereby forming a viscous amber colored solution. At 410, a base and a reagent including 2.13 ml of triethylamine followed by 11.5 ml of acetic anhydride are added to facilitate chemical reactions. At 412, 0.245 g of BTC (cross-linking agent) is added to the amber colored solution. At 414, the solution is stirred for a third time period (e.g., fifteen minutes). At 416, the solution is poured into molds where gelation occurs in 45-60 minutes. At 418, the gels are aged in the molds for a fourth time period (e.g., overnight). At 420, the gels are removed from the molds and placed in a second solvent that is miscible with liquid $CO_2$ (e.g., ethanol, methanol, acetone, etc.) to exchange the first solvent in the gel. At 422, the second solvent is replaced with fresh solvent a number of times (e.g., one time, two times, three times, four times, five times, etc. in one day intervals) to remove first solvent from the gels. At 424, the gels are placed in a supercritical drying chamber. At 426, a third solvent (e.g., acetone, etc.) in the supercritical drying chamber is exchanged a number of times (e.g., one time, two times, three times, four times, five times, etc.) with liquid $CO_2$. At 428, the supercritical drying chamber is heated to 45° C. to take the $CO_2$ to its supercritical point at which time the supercritical drying chamber is vented. The resulting yellow aerogels had a density of 0.13 g/cm³, surface area of 436 $m^2/g$ measured by nitrogen sorption-desorption, a porosity of 90% and Young's Modulus of 60 MPa measured from compression.

Figure 5:
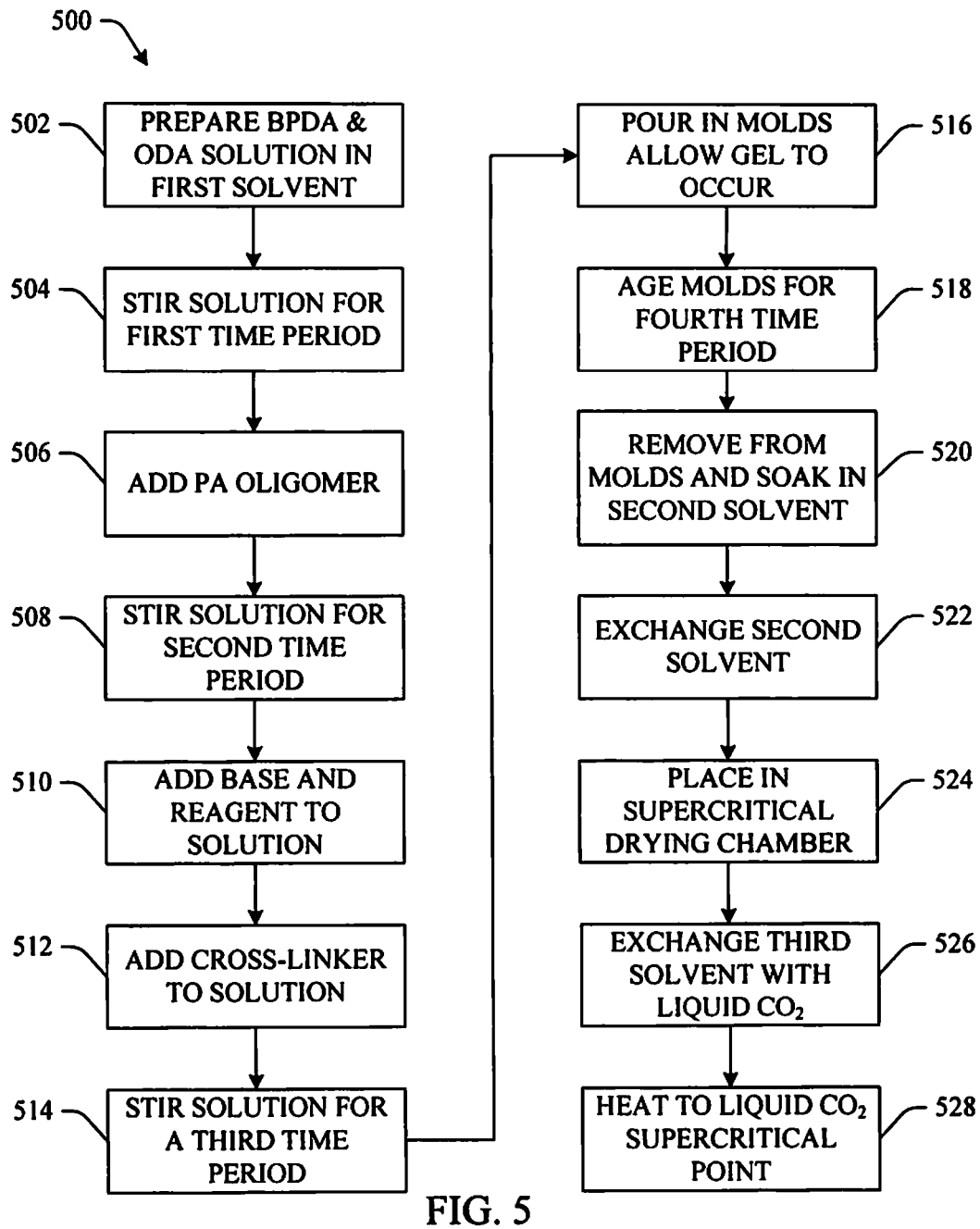
FIG. 5 illustrates another example method of fabricating a polyamide/polyimide aerogel in accordance with aspects of the subject innovation.

FIG. 5 illustrates yet another example 500 of fabricating the innovative polyamide/polyimide aerogel in accordance with an aspect of the innovation. In this example, the PA oligomer described above and illustrated in FIG. 2 where n=10 will be used with a PI oligomer where the number of repeat units (m) is 5 (m=5) along with 4,4'-oxydianiline (ODA). At 502, 2.312 g of BPDA (PI oligomer) is added to a solution of 1.311 g of ODA (diamine) in 87.549 mL of NMP (first solvent). At 504, the solution is stirred for a first time period (e.g., 15 minutes) to form a polyamic acid oligomer. At 506, 6.524 g of the PA oligomer is added. At 508, the solution is stirred for a second time period (e.g., overnight) forming an amber colored solution. At 510, a base and a reagent including 10 mL of trimethylamine followed by 5.93 mL of acetic anhydride respectively are added to the solution. At 512, 0.232 g of BTC (cross-linking agent) is added. At 514, the solution is stirred for a third time period (e.g. fifteen minutes). At 516, the solution is poured into molds where gelation occurs in 45-60 minutes. At 518, the gels are aged in the molds for a fourth time period (e.g., overnight). At 520, the gels are removed and placed into a second solvent that is miscible with liquid $CO_2$ (e.g., ethanol, methanol, acetone, etc.) in order to exchange the first solvent in the gel. At 522, the second solvent is replaced with fresh solvent a number of times (e.g., one time, two times, three times, four times, five times, etc. in one day intervals) to remove all the first solvent from the gels. At 524, the gels are placed in a supercritical drying chamber. At 526, a third solvent (e.g., acetone, etc.) in the supercritical drying chamber is exchanged a number of times (e.g., one time, two times, three times, four times, five times, etc.) with liquid $CO_2$. At 526, the supercritical drying chamber is heated to 45° C. to take the $CO_2$ to its supercritical point at which time the supercritical drying chamber is vented.

Figure 6:
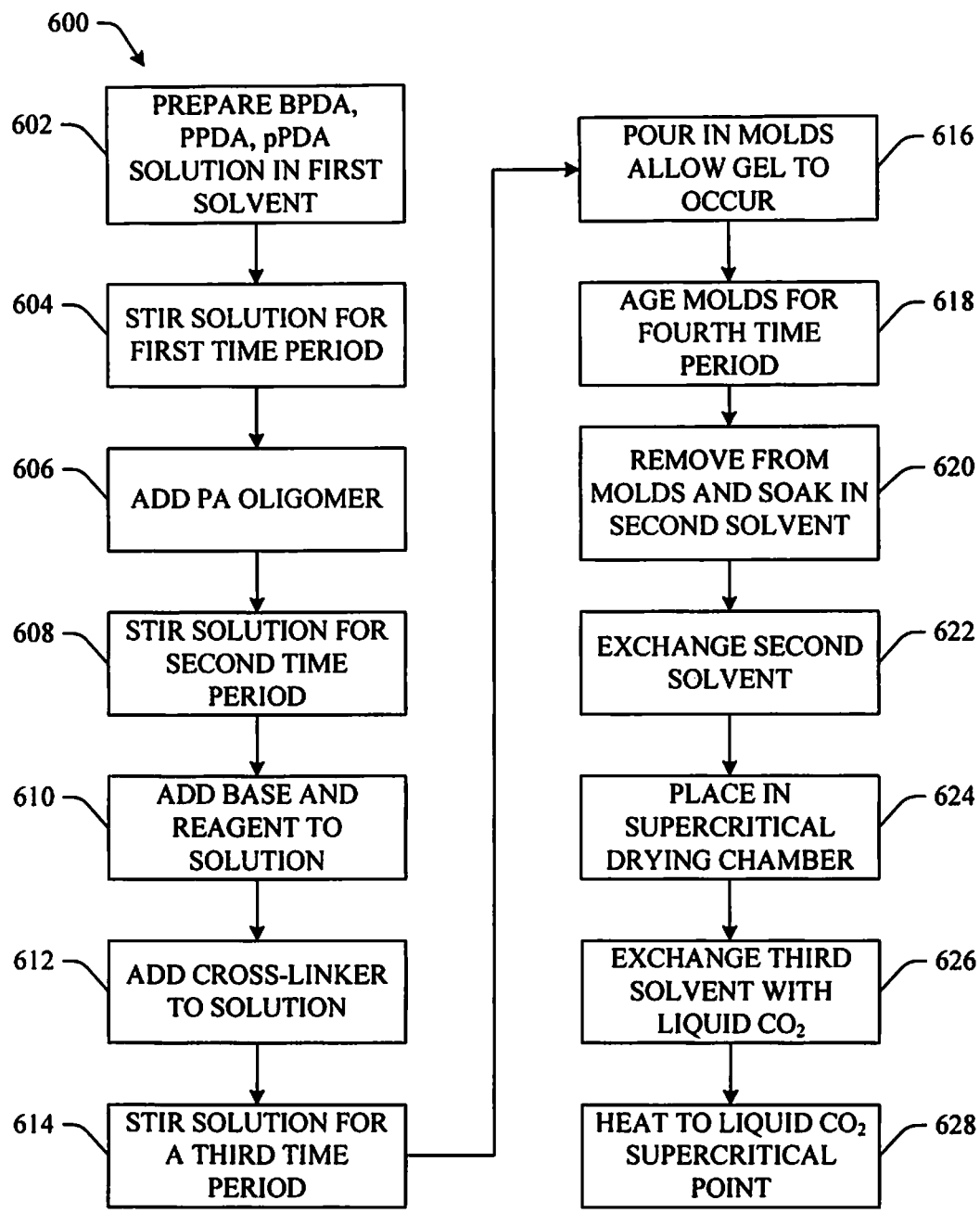
FIG. 6 illustrates another example method of fabricating a polyamide/polyimide aerogel in accordance with aspects of the subject innovation.

FIG. 6 illustrates still another example 600 of fabricating the innovative polyamide/polyimide aerogel in accordance with an aspect of the innovation. In this example, the PA oligomer described above and illustrated in FIG. 2 where n=10 will be used with a PI oligomer where the number of repeat units (m) is 10 (m=10) with p-phenylene diamine (PPDA) and 4,4'-oxydianiline (ODA) having 7.5 wt % total polymer in solution. At 602, 2.564 g of 3,3'4,4'-biphenyl-tetracarboxylic acid dianhydride (BPDA) PI polyimide) is added to a solution of 0.428 g PPDA (diamine) and 0.793 g of ODA (diamine) in 89.98 ml NMP (first solvent). At 604, the solution is stirred for a first time period (e.g., 10 minutes). At 606, 3.946 g of the PA oligomer produced above is added. At 608, the solution is stirred for a second time period (e.g., overnight) at which time it dissolves. At 610, a base and a reagent including 1.12 ml of triethylamine followed by 6.578 ml of acetic anhydride are added that facilitates chemical reactions. At 612, 0.140 g of benzene tricarboxylic acid chloride (BTC) (cross-linking agent) is added. At 614, the solution is stirred for a third time period (e.g., 1 minute). At 616, the solution is poured into molds where gelatin occurs within several hours. At 618, the gels are aged in the molds a fourth time period (e.g., overnight). At 620, the gels were then removed from the molds and placed in a second solvent that is miscible with liquid $CO_2$ (e.g., ethanol, methanol, etc.) to exchange the first solvent in the gel. At 622, the second solvent is replaced with fresh solvent a number of times (e.g., one time, two times, three times, four times, five times, etc. in one day intervals) to remove the first solvent from the gels. At 624, the gels are placed in a supercritical drying chamber. At 626, a third solvent (e.g., acetone, etc.) in the supercritical drying chamber is exchanged a number of times (e.g., one time, two times, three times, four times, five times, etc.) with liquid $CO_2$. At 628, the supercritical drying chamber is heated to 45° C. to take the $CO_2$ to its supercritical point at which time the supercritical drying chamber is vented.

Figure 7:
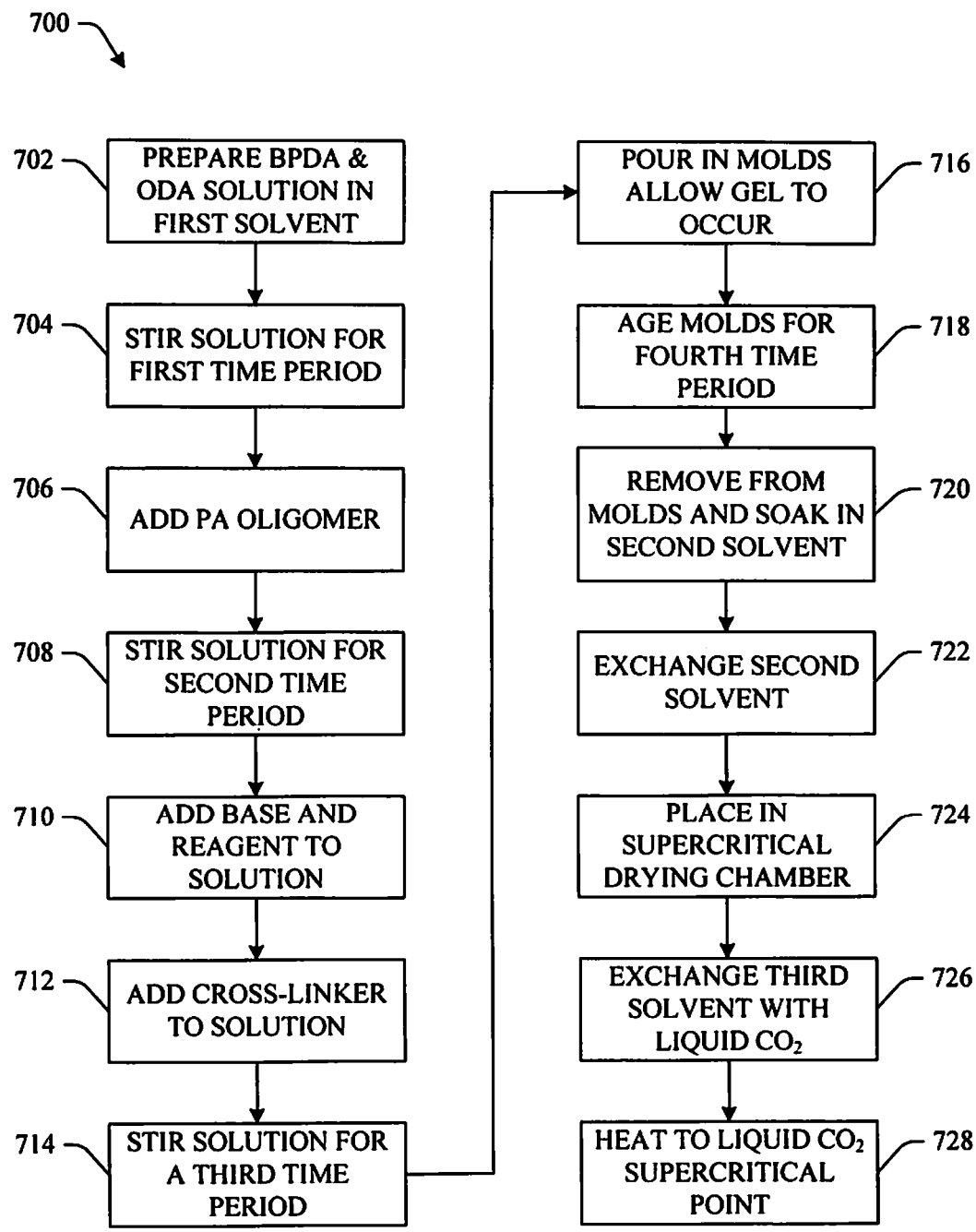
FIG. 7 illustrates another example method of fabricating a polyamide/polyimide aerogel in accordance with aspects of the subject innovation.

FIG. 7 illustrates yet another example 700 of fabricating the innovative polyamide/polyimide aerogel in accordance with an aspect of the innovation. In this example, the PA oligomer described above and illustrated in FIG. 2 where n=10 will be used with a PI oligomer where the number of repeat units (m) is 15 (m=15) with 4,4'-oxydianiline (ODA). At 702, 3.852 g of BPDA (PI oligomer) is added to a solution of 2.458 g of ODA (diamine) in 87.549 mL of NMP (first solvent). At 704, the solution is stirred for a first time period (e.g., 15 minutes) to form a polyamic acid oligomer. At 706, 4.076 g of the PA oligomer produced above is added. At 708, the solution is stirred for a second time period (e.g., overnight) forming an amber colored solution. At 710, a base and a reagent including 1.82 mL of trimethylamine followed by 9.88 mL of acetic anhydride respectively are added to facilitate chemical reactions. At 712, 0.1448 g of BTC (cross-linking agent) is added. At 714, the solution is stirred for a third time period (e.g., fifteen minutes). At 716, the solution is poured into molds where gelation occurs in 45-60 minutes. At 718, the gels are aged in the molds for a fourth time period (e.g., overnight). At 720, the gels are removed and placed into a second solvent that is miscible with liquid $CO_2$ (e.g., ethanol, methanol, etc.) in order to exchange the first solvent in the gel. At 722, the second solvent is replaced with fresh solvent a number of times (e.g., one time, two times, three times, four times, five times, etc. in one day intervals) to remove the first solvent from the gels. At 724, the gels are placed in a supercritical drying chamber. At 726, a third solvent (e.g., acetone, etc.) in the supercritical drying chamber is exchanged a number of times (e.g., one time, two times, three times, four times, five times, etc.) with liquid $CO_2$. At 728, the supercritical drying chamber is heated to 45° C. to take the $CO_2$ to its supercritical point at which time the supercritical drying chamber is vented.

The aerogels above are formulated using 10 wt % total solids in solution. Aerogels have been formulated with total solid concentration ranging from 7 to 10 wt %. Aerogels can also be formulated with PI oligomers ranging from m=5 to 15. As mentioned above, it is also anticipated that other dianhydrides and diamines can be used to formulate the aerogels. In addition, alternate cross-linkers can be used, such as but not limited to, 1,3,5-triaminophenoxybenzene (TAB), octa(aminophenyl) polyhedral oligomeric silsesquioxane (OAPS), and other multifunctional cross-linkers that can react with amine or anhydride end caps, including other triamines and triacid chlorides as well as tri-isocyanates, polymaleic anhydrides and others.

As mentioned above, polyamide aerogels have superior mechanical properties, but some formulations undergo shrinkage and/or distortion during processing thereby making the fabrication of uniform net shapes problematic. The starting materials, however, are inexpensive. Polyimides, on the other hand, do not undergo shrinkage and/or distortion, but rely in dianhydrides, which are expensive. Combining the two classes of polymer aerogels into polyimide/polyamide aerogels offers the combination of lower cost, higher mechanical properties, and no shrinkage and/or distortion during processing resulting in uniform net shapes.

What has been described above includes examples of the innovation. It is, of course, not possible to describe every conceivable composition, article, or methodology for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of creating an aerogel comprising:
preparing a solution including an anhydride endcapped polyimide oligomer in a first solvent;
adding at least one amine endcapped polyamide oligomer to the solution; adding a cross-linking agent to the solution;
allowing the solution to become a gel; and subjecting the gel to supercritical drying.

2. The method of claim 1, wherein prior to subjecting the gel to supercritical drying, the method further including placing the gel in a second solvent that is miscible with liquid carbon dioxide and exchanging the second solvent at least one time to remove the first solvent.

3. The method of claim 2 further comprising placing the gel in a supercritical drying chamber and exchanging a third solvent in the supercritical drying chamber with the liquid carbon dioxide.

4. The method of claim 3, wherein subjecting the gel to supercritical drying includes heating the supercritical drying chamber to a critical point of the liquid carbon dioxide and venting the supercritical drying chamber.

5. The method of claim 1, wherein the anhydride endcapped polyimide oligomer and the amine endcapped polyamide oligomer react with each other to form block copolymers having alternating polyimide and polyamide segments of varied length.

6. The method of claim 1, wherein the anhydride endcapped polyimide oligomer and the amine endcapped polyamide oligomer are amine terminated and react separately in the solution with the cross-linking agent.

\* \* \* \* \*